(12) United States Patent
Vasudevan et al.

(10) Patent No.: US 8,768,659 B2
(45) Date of Patent: Jul. 1, 2014

(54) METHOD AND SYSTEM OF DATA MODELLING

(75) Inventors: Shrihari Vasudevan, Chippendale (AU); Fabio Tozeto Ramos, Erskineville (AU); Eric Nettleton, Kellyville (AU); Hugh Durrant-Whyte, Rozelle (AU)

(73) Assignee: The University of Sydney, The University of Sydney, New South Wales (AU)

( * ) Notice: Subject to any disclaimer, the term of this patent is extended or adjusted under 35 U.S.C. 154(b) by 558 days.

(21) Appl. No.: 13/119,952

(22) PCT Filed: Sep. 18, 2009

(86) PCT No.: PCT/AU2009/001235
§ 371 (c)(1),
(2), (4) Date: Jul. 1, 2011

(87) PCT Pub. No.: WO2010/031128
PCT Pub. Date: Mar. 25, 2010

(65) Prior Publication Data
US 2011/0257949 A1    Oct. 20, 2011

(30) Foreign Application Priority Data
Sep. 19, 2008  (AU) ............................... 2008904884

(51) Int. Cl.
*G06F 7/60*        (2006.01)
(52) U.S. Cl.
USPC ........................................................... 703/2

(58) Field of Classification Search
USPC ......... 703/2, 6, 13; 435/6; 382/224, 154, 264, 382/132; 379/406.01; 706/16, 21, 25; 704/250; 702/19, 22
See application file for complete search history.

(56) References Cited

U.S. PATENT DOCUMENTS

| | | | |
|---|---|---|---|
| 6,347,310 B1* | 2/2002 | Passera | 706/25 |
| 7,542,949 B2* | 6/2009 | Wren et al. | 706/16 |
| 2003/0167135 A1* | 9/2003 | Ewing | 702/22 |
| 2003/0191728 A1* | 10/2003 | Kulkarni et al. | 706/21 |
| 2003/0198340 A1* | 10/2003 | Picciolo et al. | 379/406.01 |
| 2004/0073414 A1* | 4/2004 | Bienenstock et al. | 703/2 |
| 2004/0225498 A1* | 11/2004 | Rifkin | 704/250 |
| 2005/0278124 A1* | 12/2005 | Duffy et al. | 702/19 |
| 2007/0065844 A1* | 3/2007 | Golub et al. | 435/6 |
| 2007/0127824 A1* | 6/2007 | Luo et al. | 382/224 |
| 2007/0280528 A1* | 12/2007 | Wellington et al. | 382/154 |
| 2008/0187207 A1* | 8/2008 | Bhanot et al. | 382/132 |

(Continued)

OTHER PUBLICATIONS

Shevade et al., "Predictive Approaches for Sparse Model Learning", Neural information processing, 2004.*

(Continued)

*Primary Examiner* — Kandasamy Thangavelu
(74) *Attorney, Agent, or Firm* — Blakely, Sokoloff, Taylor & Zafman LLP

(57) ABSTRACT

A method for modelling a dataset includes a training phase, wherein the dataset is applied to a non-stationary Gaussian process kernel in order to optimize the values of a set of hyperparameters associated with the Gaussian process kernel, and an evaluation phase in which the dataset and Gaussian process kernel with optimized hyperparameters are used to generate model data. The evaluation phase includes a nearest neighbor selection step. The method may include generating a model at a selected resolution.

20 Claims, 5 Drawing Sheets

(56) References Cited

U.S. PATENT DOCUMENTS

| | | | |
|---|---|---|---|
| 2009/0043547 A1* | 2/2009 | Kirby et al. ............... | 703/2 |
| 2009/0150126 A1* | 6/2009 | Sellamanickam et al. ....... | 703/2 |
| 2009/0274385 A1* | 11/2009 | Zhu et al. ............... | 382/264 |
| 2010/0174514 A1* | 7/2010 | Melkumyan et al. .......... | 703/2 |

OTHER PUBLICATIONS

Sundararajan et al., "Predictive Approaches for Choosing Hyperparameters in Gaussian Processes", Neural computation, 2001.*

Park et al., "Gaussian Processes for Source Separation", IEEE, 2008.*

Vehtari et al., "On Bayesian Model Assessment and Choice Using Cross-Validation Predictive Densities", Helsinki University of Technology, Apr. 2001.*

PCT Notification of Transmittal of the International Search Report and the Written Opinion of the International Searching Authority, or the Declaration for PCT Counterpart Application No. PCT/AU2009/001235, 11 pgs., (Oct. 21, 2009).

Tobias Lang, et al., "Adaptive Non-Stationary Kernel Regression for Terrain Modeling," Robotics: Science and Systems III, 8 pgs., (Jun. 30, 2007).

Shrihari Vasudevan, et al., "Gaussian Process Modeling of Large-Scale Terrain," Journal of Field Robotics, vol. 26, Issue 10, pp. 812-840, (Sep. 3, 2009).

Yirong Shen, et al., "Fast Gaussian Process-Regression using KD-Trees," Advances in Neural Information Processing Systems 18, Proceedings of the 2005 Conferences, pp. 1225-1232, (2006).

F. P. Preparata, M.I. Shamos. 'Computational Geometry: An Introduction, With 234 Illustrations,' 1985, pp. 71, 74-79, Springer-Verlag New York Inc., 175 Fifth Avenue, New York, NY 10010, U.S.A.

J. Nocedal, S. J. Wright, Springer Series in Operations Research, 'Numerical Optimization, With 85 Illustrations,' 2006, Chapters 1 and 6, 85 pages. Springer-Verlag New York Inc., 175 Fifth Avenue, New York, NY 10010, U.S.A.

\* cited by examiner

METHOD AND SYSTEM OF DATA MODELLING

CROSS-REFERENCE TO RELATED APPLICATIONS

This patent application is a U.S. National Phase application under 35 U.S.C. §371 of International Application No. PCT/AU2009/001235, filed Sep. 18, 2009, entitled A METHOD AND SYSTEM OF DATA MODELLING, which claims priority to Australian patent application number 2008904884, filed Sep. 19, 2008.

FIELD OF THE INVENTION

This invention relates to the field of data analysis and synthesis. Embodiments of the invention have application to modelling large scale data sets, which may also be a sparse and/or an uncertain representation of the underlying subject matter. For example embodiments of the invention may have particular application to digital terrain modelling. The digital terrain modelling may be particularly applicable, but not limited to, use in robotic vehicle navigation. Other examples of applications include, but are not limited to, mining, environmental sciences, hydrology, economics and robotics.

BACKGROUND OF THE INVENTION

Large scale terrain mapping is a difficult problem with wide-ranging applications, from space exploration to mining and more. For autonomous robots to function in such "high value" applications, it is important to have access to an efficient, flexible and high-fidelity representation of the operating environment. A digital representation of the operating environment in the form of a terrain model is typically generated from sensor measurements of the actual terrain at various locations within the operating environment. However, the data collected by sensors over a given area of terrain may be less than optimal, for a number of reasons. For example, taking many samples may be cost prohibitive, sensors may be unreliable or have poor resolution, or terrain may be highly unstructured. In other words, there may be uncertainty and/or incompleteness in data collected by sensors. Uncertainty and incompleteness are virtually ubiquitous in robotics as sensor capabilities are limited. The problem is magnified in a field robotics scenario due to the sheer scale of the application such as in a mining or space exploration scenario.

State of the art digital terrain representations generally map surfaces or elevations. However, they do not have a statistically sound way of incorporating and managing uncertainty. The assumption of statistically independent measurement data is a further limitation of many works that have used these approaches. While there are several interpolation techniques known, the independence assumption can lead to simplistic (simple averaging like) techniques that result in an inaccurate modelling of the terrain. Further, the limited perceptual capabilities of sensors renders most sensory data incomplete.

State of the art representations used in applications such as mining, space exploration and other field robotics scenarios as well as in geospatial engineering can be generally categorised as elevation maps, triangulated irregular networks (TIN's), contour models and their variants or combinations. Each approach has its own strengths and preferred application domains.

Grid based methods use a regularly spaced triangular, square (typical), rectangular or angular grid to represent space—the choice of the profile being dependent on the size of the area to be examined. A typical model would represent the elevation data corresponding to such a regularly spaced profile. The resulting representation would be a 2.5D representation of space. The main advantage of this representation is simplicity. The main limitations include the inability to handle abrupt changes, the dependence on the grid size, and the issue of scalability in large environments. In robotics, grid maps have been exemplified by numerous works, however the main weakness observed in most prior work in grid based representations is the lack of a statistically direct way of incorporating and managing uncertainty.

Triangulated Irregular Networks (TIN's) usually sample a set of surface specific points that capture all important aspects of the surface to be modelled—including bumps/peaks, troughs, breaks etc. The representation typically takes the form of an irregular network of such points (x,y,z) with each point having pointers to its immediate neighbours. This set of points is represented as a triangulated surface (the elemental surface is therefore a triangle). TINs are able to more easily capture sudden elevation changes and are also more flexible and efficient than grid maps in relatively flat areas. Overall, while this representation may be more scalable (from a surveyors perspective) than the grid representations, it may not handle incomplete data effectively—the reason being the assumption of statistical independence between data points. As a result of this, the elemental facet of the TIN—a triangle (plane)—may very well approximate the true nature of a "complicated" surface beyond acceptable limits. This however depends on the choice of the sensor and the data density obtained. It has been observed in the prior art that TiN's can be accurate and easily textured, with the main disadvantage being huge memory requirement which grows linearly with the number of scans. Piecewise linear approximations have been used to address this issue.

Other representations discussed in the prior art include probability densities, wavelets and contour based representations. The latter most represents the terrain as a succession of "isolines" of specific elevation (from minimum to maximum). They are naturally suited to model hydrological phenomena, however they require an order of magnitude more storage and do not provide any particular computational advantages.

There are several different kinds of interpolation strategies for grid data structures. The interpolation method basically attempts to find an elevation estimate by computing the intersection of the terrain with the vertical line at the point in the grid—this is done in image space rather than cartesian space. The choice of the interpolation method can have severe consequences on the accuracy of the model obtained.

The problems posed by large scale terrain mapping, associated with the size and characteristics of the data may also be present in other computer learning applications where data needs to be analysed and synthesised to create a model, forecast or other representation of the information on which the data is based.

SUMMARY OF THE INVENTION

According to the present invention there is provided, in a first aspect, a method for modelling data based on a dataset, including a training phase, wherein the dataset is applied to a non-stationary Gaussian process kernel in order to optimize the values of a set of hyperparameters associated with the Gaussian process kernel, and an evaluation phase in which the dataset and Gaussian process kernel with optimized hyperparameters are used to generate model data.

The data may be large scale terrain data and the model data may be output at a selected resolution. The data may be a sparse representation of the underlying subject of the model.

In one form of the invention, the method includes a step of sampling the measured terrain data to obtain a training data subset that is applied in the training phase for optimization of the hyperparameters. The sampling may be performed on the basis of uniform, random, and/or informed heuristic sampling methodologies.

In one form of the invention the measured terrain data or training data subset is organised and stored in a hierarchical data structure for efficient access during the evaluation phase. The hierarchical data structure may comprise a k-dimensional tree (KD-Tree) structure In another form of the invention, the evaluation phase includes the generation of a probabilistic uncertainty estimate for the terrain model data generated.

The evaluation phase may include a nearest neighbour selection step, wherein only a selected subset of nearest neighbour measured terrain data is used to generate each corresponding terrain model datum.

The Gaussian process kernel can be a non-stationary neural network kernel.

The optimization of hyperparameter values may include a maximum marginal likelihood estimation (MMLE) formulation. In one form of the invention the optimization includes a simulated annealing stochastic search. In another form of the invention the optimization includes a gradient descent method, such as a Quasi-Newton optimization with Broyden-Fletcher-Goldfarb-Shanno (BFGS) hessian update. In another form of the invention the optimization comprises a combination of stochastic search and gradient descent.

In accordance with the present invention, there is provided, in a second aspect, a system for large scale data modelling, including:
  at least one spatial data measurement sensor for generating measured terrain data in relation to a selected geographical region;
  a training processor adapted to apply the measured terrain data to a non-stationary Gaussian process kernel in order to determine optimum values for hyperparameters associated with the kernel in relation to the measured terrain data; and
  an evaluation processor adapted to apply a selected terrain model output resolution to the Gaussian process kernel with optimised hyperparameter values and obtain terrain model output data for the selected output resolution.

In accordance with the present invention, there is provided, in a third aspect, a method for modelling a dataset with a spatial characteristic, such as an area of terrain, comprising providing measured data to a non-parametric, probabilistic process to derive a model from the dataset, and saving a data set describing the model in a database that preserves the spatial characteristics of the data.

The database may utilise a KD-Tree structure to store the modelled terrain data.

The process utilised may be a Gaussian process, such as a non-stationary Gaussian process, or for example, a neural network.

The data set may include hyperparameters describing the model.

The terrain data may be divided into at least two subsets, wherein each subset is provided to the non-parametric, probabilistic process to derive a terrain model for each of the subsets of the terrain data.

In accordance with the present invention, there is provided, in a fourth aspect, method for determining the topography of an area of terrain, comprising utilising measured terrain data and data derived from a model of the area of terrain to generate terrain model data for a selected region in the area of terrain.

The step of generating terrain model data may further include selecting spatially close model data from a database to generate model data for the selected region.

The model data may be provided in a KD-tree database structure.

The method may comprise the further step of calculating an uncertainty measure, wherein the uncertainty measure provides an indication of the uncertainty regarding the accuracy of the generated model data for the selected region.

The method may also comprise the further step of displaying the terrain model data at a selected resolution.

On receipt of newly acquired measured terrain data, a new model of the area of the terrain may be derived based, at least in part, on the newly acquired terrain data.

Newly acquired terrain data may be incorporated into the database, in addition to being used to derive a new model.

In accordance with the present invention, there is provided, in a fifth aspect a system for modelling an area of terrain, comprising a modelling module arranged to receive measured terrain data and utilise a non-parametric, probabilistic process to derive a model for the area of terrain, and a data structure arranged to receive a data set describing the model wherein the data structure preserves the spatial characteristics of the data.

In accordance with the present invention, there is provided, in a sixth aspect, a system for determining the topography of an area of terrain, comprising an evaluation module arranged to utilise measured terrain data and data derived from a model of the area of terrain to generate terrain model data for a selected region in the area of terrain.

In accordance with the present invention, there is provided, in a seventh aspect, a computer program including at least one instruction arranged to implement the method steps of at least one of the first, third or fourth aspect of the invention.

In accordance with the present invention, there is also provided, in an eighth aspect, a computer readable media incorporating a computer program in accordance with the seventh aspect of the invention.

In accordance with the present invention, there is provided, in a ninth aspect, a navigation system incorporating a computer program in accordance with a seventh aspect of the invention.

In accordance with the present invention, there is provided, in a tenth aspect, a vehicle incorporating a navigation system in accordance with a ninth aspect of the invention.

Further aspects of the present invention and embodiments of the aspects described in the preceding paragraphs will become apparent from the following description.

BRIEF DESCRIPTION OF THE DRAWINGS

The invention in its detail will be better understood through the following description of an embodiment and example applications thereof, together with the illustrations in the accompanying drawings in which.

DETAILED DESCRIPTION OF THE EMBODIMENTS

It will be understood that the invention disclosed and defined in this specification extends to all alternative combinations of two or more of the individual features mentioned or evident from the text or drawings. All of these different combinations constitute various alternative aspects of the invention.

Embodiments of the present invention are described hereinbelow. The embodiments are described with reference to the application of modelling large scale terrain, for example on the scale of an open pit mine, on the basis of measured sensor data. The terrain model can then be applied by autonomous robotic vehicles and the like to navigate within the region of terrain modelled. However, the present invention has application to other machine learning problems, particularly those involving large scale data sets. In particular, the invention may have application to data sets containing 100,000 or more points, 500,000 or more points, or 1,000,000 or more points.

The terrain modelling problem can be understood as follows. Given a sensor that provides terrain data as a set of points (x,y,z) in 3D space, the objectives are to:
1) develop a multi-resolution representation that incorporates the sensor uncertainty in an appropriate manner; and
2) effectively handle the sensing limitations, such as incomplete sensor information due to obstacles.

Furthermore, scalability is also addressed in order to handle large data sets.

1. SYSTEM OVERVIEW

Figure 1A:
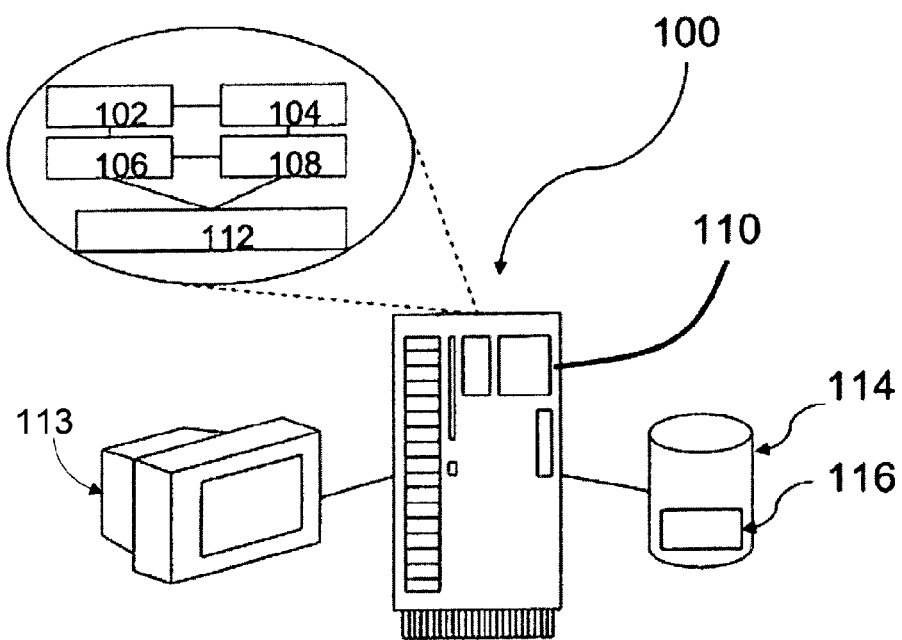
FIG. 1a is an example computing system utilisable to implement a terrain modelling system in accordance with an embodiment of the invention.

Referring to FIG. 1a, an embodiment of a terrain modelling system is implemented with the aid of appropriate computer hardware and software in the form of a computing system 100. The computing system 100 comprises suitable components necessary to receive, store and execute appropriate computer instructions. The components may include a processing unit 102, read only memory (ROM) 104, random access memory (RAM) 106, an input/output device such as disk drives 108, communication links 110 such an Ethernet port, a USB port, etc. Display 113 such as a liquid crystal display, a light emitting display or any other suitable display. The computing system 100 includes instructions that may be included in ROM 104, RAM 106 or disk drives 108 and may be executed by the processing unit 102. There may be provided a plurality of communication links 110 which may variously connect to one or more computing devices such as a server, personal computers, terminals, wireless, handheld computing devices or other devices capable of receiving and/or sending electronic information. At least one of a plurality of communications links may be connected to an external computing network through a telephone line, an Ethernet connection, or any type of communications link. Additional information may be entered into the computing system by way of other suitable input devices such as, but not limited to, a keyboard and/or mouse (not shown).

The computing system may include storage devices such as a disk drive 108 which may encompass solid state drives, hard disk drives, optical drives or magnetic tape drives. The computing system 100 may use a single disk drive or multiple disk drives. A suitable operating system 112 resides on the disk drive or in the ROM of the computing system 100 and cooperates with the hardware to provide an environment in which software applications can be executed.

In particular, the data storage system is arranged to store measurement data received from the sensors, in a suitable database structure 114. The data storage system also includes a terrain model 116, which is utilised with the measurement data to provide a 2.5D "map" of the terrain. The data storage system may be integral with the computing system, or it may be a physically separate system.

In more detail, the data storage system is loaded with a terrain modelling module including various sub-modules (not shown). The sub-modules are arranged to interact with the hardware of the computing system 100, via the operating system 112, to either receive the data collected by the measurement sensors (generally sent via the communications links 110) and/or process the received data to provide the measured terrain data. In some embodiments, there may be provided a visual display unit, which may be in either local or remote communication with the computing system 100, and is arranged to display information relating to the programs being run thereon. In other embodiments, the data may be used directly by an autonomous robot (e.g. an automated vehicle) to perform particular tasks, such as navigation of the terrain.

Figure 1B:
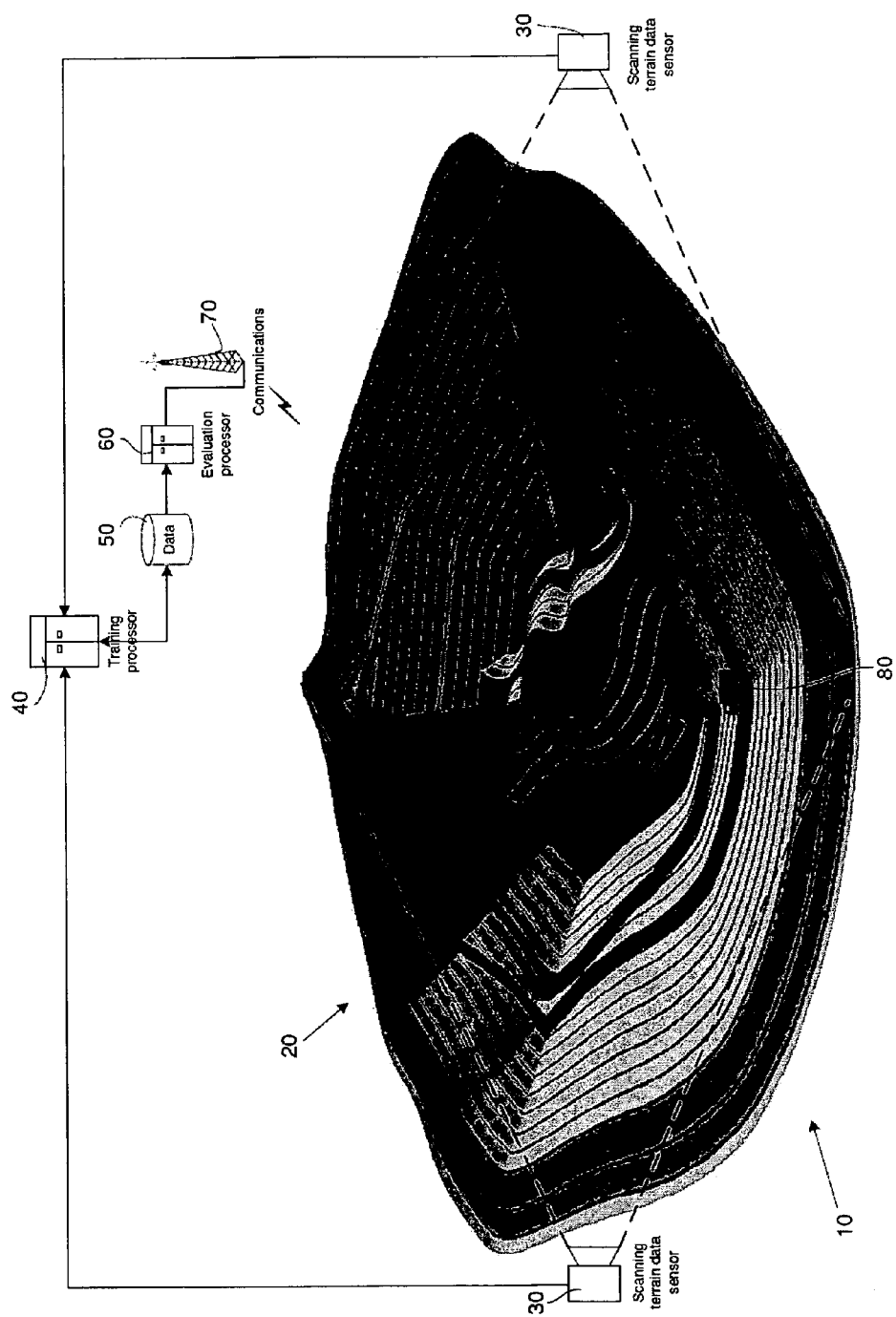
FIG. 1b is a diagrammatic illustration of a terrain region and a system adapted for generating and maintaining a corresponding digital terrain model for use in controlling autonomous vehicles.

FIG. 1b is a diagrammatic illustration of a terrain region and a system adapted for generating and maintaining a corresponding digital terrain model for use in controlling autonomous vehicles. The terrain modelling system 10 operates on a terrain region 20 in the form of an open pit mine, and utilises one or more measurement sensors 30 to provide measured terrain data about the region 20.

In more detail, the sensors 30 provide spatial data measured from the terrain region 20 which can be generated by a number of different methods, including laser scanning, radar scanning, GPS or manual survey. One example of an appropriate measurement sensor is the LMS Z420 time-of-flight laser scanner available from Riegl. This form of sensor can be used to scan the environment region and generate a 3D point cloud comprising (x, y, z) data in three frames of reference. In the embodiment described herein, two separate scanners are shown disposed on opposite sides of the terrain to be modelled so as to minimise occlusions and the like.

The measurement sensor data generated by the sensors 30 is provided to a training module 40 of the terrain modelling module. The training module 40 is adapted to organise the sensor data and determine a non-parametric, probabilistic, multi-scale representation of the data for use in terrain modelling, which is stored in the data storage 50. Details of the specific operational procedures carried out by the training processor are described hereinbelow and particularly with reference to FIG. 2.

The terrain modelling module also implements an evaluation module which is operable to access the data storage 50 and utilise the data from the data storage 50 and terrain model data according to a desired modelling grid resolution. Specific operational details of the evaluation module are provided hereinbelow and particularly with reference to FIG. 3. Once the terrain model data has been generated it can be communicated to an autonomous robotic vehicle 80, operating within the modelled environment, by a suitable communications medium 70, such as a radio communication link.

2. OVERVIEW OF MODELLING PROCESS

Figure 2:
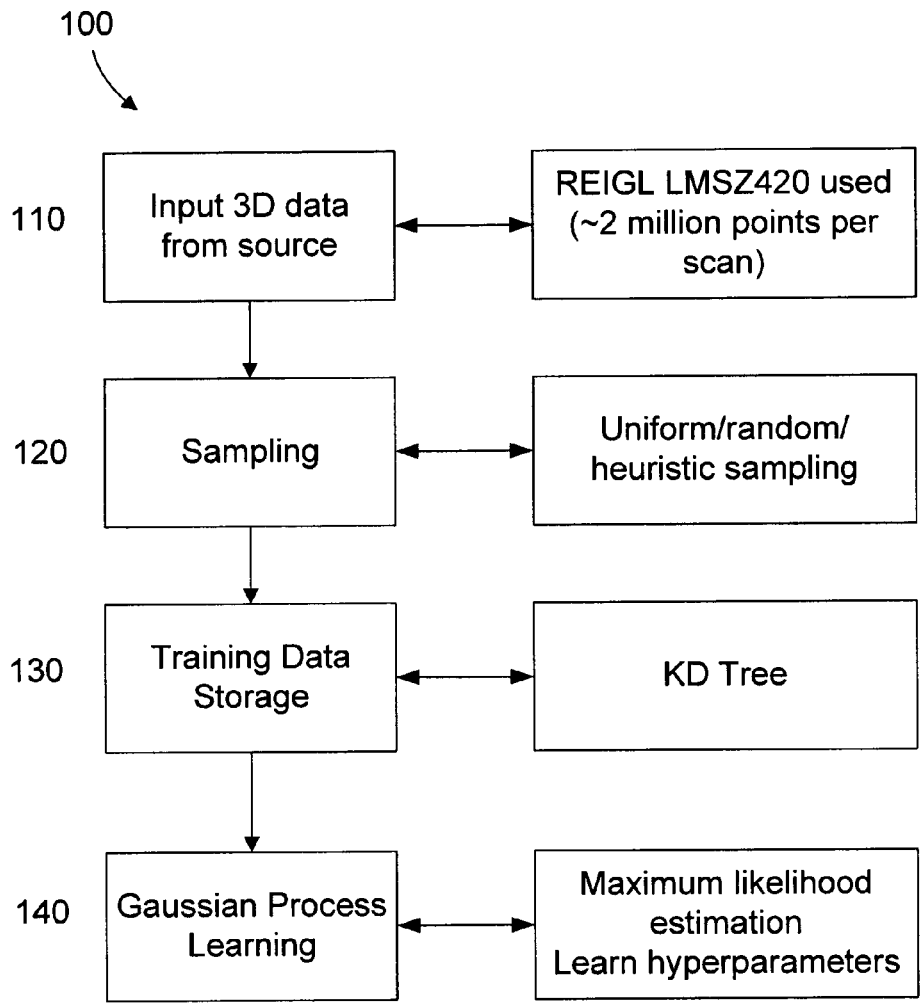
FIG. 2 is a flow-chart diagram showing a training phase for a terrain data modelling process.

FIG. 2 is a flow-chart diagram showing a training phase procedure 100 for the terrain data modelling process of the example embodiment. The procedure 100 begins with obtaining sensor measurement data at step 110 from an appropriate source, in this case a Riegl LMS Z420 3D laser scanner. The laser scanner mentioned generates of the order of two-million data points for a given scan. In order to reduce the computational complexity involved with dealing with such a large dataset, a sampling stage is employed at step 120 to reduce the number of data points to be used for actually generating the terrain model. If the measurement data were obtained from Global Positioning System (GPS) surveying, or some other relatively sparse sensor methodology the sampling step can be omitted. A number of different sampling strategies can be successfully employed, including uniform sampling, random sampling, or an informed/heuristic sampling approach (for instance, sampling preferentially in areas of high gradient or the like). By way of example, the sampling step 120 may be used to reduce the sensor measurement dataset from millions of data points down to thousands of data points.

Following the sampling stage, the sampled measurement dataset is stored, at step 130, in the data storage 50 for further use. Many different data structures exist, however the embodiment described herein makes use of a KD-Tree hierarchical data structure. The use of such a data structure provides the training and evaluation modules with rapid access to the sampled measurement data on demand. In addition, a KD-Tree hierarchical data structure preserves spatial information.

The data storage step is followed by a Gaussian Process (GP) learning procedure at step 140, with the objective of learning a representation of the spatial data. Details of the GP learning procedure are provided hereinbelow. This method provides for a non-parametric, probabilistic, multi-scale representation of the data. In other words, while a GP is utilised in the embodiment described herein, any suitable non-parametric, probabilistic process may be utilised to "learn" a representation of the data.

In particular, in the GP learning procedure, a maximum marginal likelihood estimation (MMLE) method is used in order to optimise a set of hyperparameters associated with a GP kernel. By 'optimise' it is meant that the hyperparameters are set at values that are expected to result in reduced error in comparison to other values, but are not necessarily set at the most optimum values. The kernel hyperparameters provide a coarse description of the terrain model, and can be used together with the sampled sensor measurement data to generate detailed terrain model data at a desired resolution. Moreover, as a non-parametric, probabilistic process is utilised, information regarding the uncertainty can also be captured and provided. That is, a statistically sound uncertainty estimate is provided. The optimized kernel hyperparameters are stored, together with the KD-Tree sample data structure, for use by the evaluation module.

Figure 3:
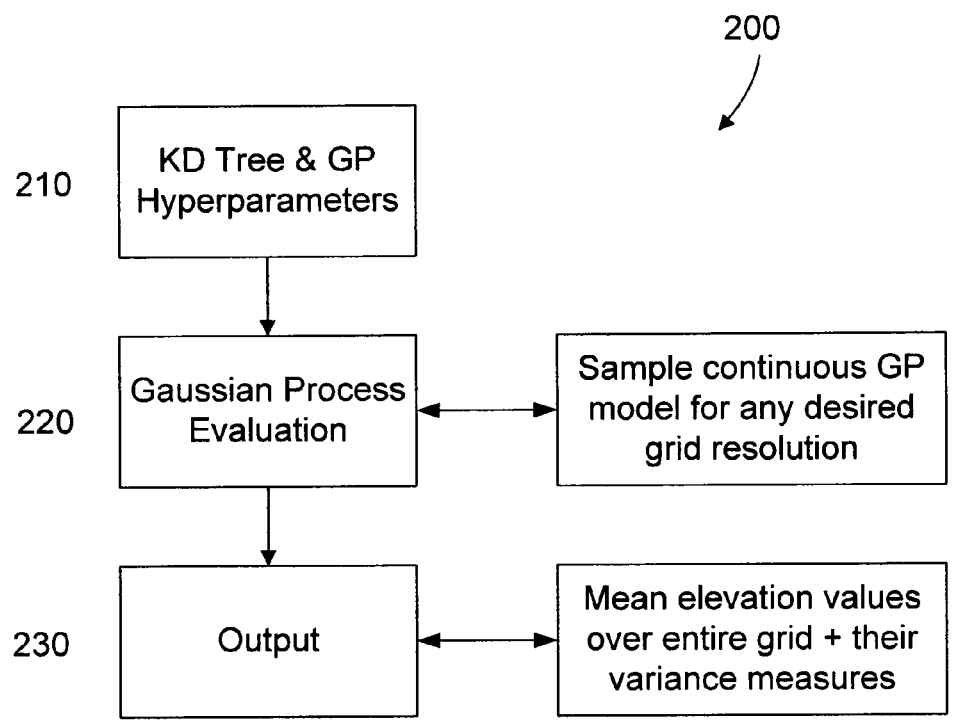
FIG. 3 is a flow-chart diagram showing an evaluation phase for a terrain data modelling process.

FIG. 3 is a flow-chart diagram showing an evaluation phase procedure 200 implemented by the evaluation module for the terrain data modelling process. It will be understood that this process may occur independently of the process described with reference to FIG. 2. That is, in one embodiment, the GP is utilised to determine an appropriate model. Information regarding the model (such as the hyperparameters) may then be stored, along with the sensor measurement spatial data, in a database. The database may then be distributed to users, such that the evaluation model may utilise the information contained within the database.

Returning to the evaluation phase 200, the sensor measurement spatial data stored in the KD-Tree and the Gaussian process model hyperparameters obtained in the learning phase are retrieved from the database (210). Since the Gaussian process representation obtained is modelled as a continuous domain, applying the model for a desired resolution amounts to sampling the model at that resolution. This can be performed at step 220 as outlined below.

A grid in the area of interest, at the desired resolution is formed. The learnt spatial model is utilised to estimate the elevation at individual points in the grid. Each point in the grid is interpolated with respect to the model learnt in the previous step and the nearest training data around that point. For this step, the KD-Tree efficiently provides access to the nearest known spatial data. This together with the learnt model provides an interpolation estimate for the desired location in the grid. The estimate is also accompanied with an uncertainty measure that is simultaneously computed in a statistically sound manner.

The output 230 of the Gaussian process evaluation from step 220 is a digital elevation map or grid, which is provided at the chosen resolution and region of interest together with an appropriate measure of uncertainty for every point in the map. The digital elevation map may be used as provided or may be rapidly processed into a digital surface/terrain model and used thereafter for robotic vehicle navigation and the like in known fashion.

Further details of the terrain modelling method and system of the illustrated embodiment are set forth below, with a particular focus on the details of the Gaussian process and underlying mathematical principles and procedures. This is followed by a description of some example terrain modelling performed by this embodiment of the invention.

The example embodiment employs Gaussian Processes (GPs) for modelling and representing terrain data. GPs provide a powerful learning framework for learning models of spatially correlated and uncertain data. Gaussian Process Regression provides a robust means of estimation and interpolation of elevation information that can handle incomplete sensor data effectively. GPs are non-parametric approaches in that they do not specify an explicit functional model between the input and output. They may be thought of as a Gaussian Probability Distribution in function space and are characterised by a mean function m(x) and the covariance function k(x, x') where $$m(x)=E[f(x)] \qquad (1)$$

$$k(x,x')=E[(f(x)-m(x))(f(x')-m(x'))] \qquad (2)$$

such that the GP is written as $$f(x) \sim GP(m(x), k(x,x')) \qquad (3)$$

The mean and covariance functions together provide a distribution over functions. In the context of the problem at hand, each $x \equiv (x, y)$ and $f(x) \equiv z$ of the given data.

2.1 The Covariance Function in the Gaussian Process

The covariance function models the covariance between the random variables which, here, correspond to sensor measured data. Although not necessary, for the sake of convenience the mean function m(x) may be assumed to be zero by scaling the data appropriately such that it has a mean of zero. There are numerous covariance functions that can be used to model the spatial variation between the data points. A popular covariance function is the squared-exponential covariance function given as $$k_y(x_p, x_q) = \sigma_f^2 \exp\left(-\frac{1}{2l^2}(x_p - x_q)^2\right) + \sigma_n^2 \delta_{pq} \quad (4)$$

where $k_y$ is the covariance function; l is the characteristic length, a measure of how quickly the $f(x)$ value changes in relation to the x value; $\sigma_f^2$ is the signal variance and $\sigma_n^2$ is the noise variance in the data being modelled. The symbol $\delta_{pq}$ represents a Kroeneker Delta defined on indices p and q. The set of parameters l, $\sigma_f$, $\sigma_n$ are referred to as the hyperparameters and specify what sort of values the parameters might take.

Another covariance function is the neural network covariance function. It is specified by $$k_y(x, x') = \sigma_f^2 \arcsin\left(\frac{\beta + 2x^T \sum x'}{\sqrt{(1 + \beta + 2x^T \sum x)(1 + \beta + 2x'^T \sum x')}}\right) + \sigma_n^2 \delta_{pq} \quad (5)$$

where $\Sigma$, $\sigma_f$, $\beta$ and $\sigma_n$ are the hyperparameters associated with the GP covariance function.

The difference between these two covariance functions is that the squared-exponential covariance function, being a function of |x−x'|, is stationary (invariant to translation) and isotropic (same behaviour in all directions) whereas the neural network covariance function is not so. In practice, the squared exponential covariance function has a smoothing or averaging effect on the data. The neural network covariance function proves to be much more effective than the squared exponential covariance function in handling discontinuous (rapidly changing) data, which may characterise terrain data.

2.2. Selecting a Kernel

When evaluating the GP, different types of kernels can be used. Two types of kernels are described and compared below.

Squared Exponential Kernel

The squared exponential (SQEXP) kernel is a function of |x−x'| and is thus stationary and isotropic meaning that it is invariant to all rigid motions. The SQEXP function is also infinitely differentiable and thus tends to be smooth. The kernel is also called the Gaussian kernel. It functions similarly to a Gaussian filter being applied to an image. The point at which the elevation has to be estimated is treated as the central point/pixel. Training data at this point together with the those at points around it determine the elevation. As a consequence of being a function of the Euclidean distance between the points and the fact that the correlation is inversely proportional to the distance between them, the SQEXP kernel is prone to producing smoothened (possibly overly) models. Points that are far away from the central pixel contribute less to its final estimate whereas points nearby the central pixel have maximum leverage. The correlation measures of far off points no matter how significant they may be, are diminished. This is in accordance with the "bell-shaped" curve of the kernel.

Neural Network Kernel

The neural network (NN) kernel treats data as vectors and is a function of the dot product of the data points. Hence, the NN kernel is dependent on the coordinate origin and not the central point in a window of points, as explained about SQEXP above. Spatial correlation is a function of the distance of the points from the data origin until reaching a saturation point. In the saturation region, the correlation of points are similar. It is this kernel behaviour that enables the resulting GP model to adapt to rapid or large variations in data.

Neural networks raise an issue of scalability when applied to large scale applications. As described below, scalability is addressed using a local approximation method. The local approximation method also serves to bound the region over which the kernel is applied (hence, enabling effective usage of the kernel) as even two distant points lying in the saturation region of the kernel will be correlated. The effect of using the NN kernel alongside the local approximation leads to a form of locally non-stationary GP regression for large scale terrain modelling. The fact that correlation increases (until saturation) with distance in the NN kernel, although apparently counter intuitive, may be thought of as a "noise-filtering" mechanism, wherein, a greater emphasis is placed on the neighbourhood data of a point under consideration. Such a behaviour is not seen in the SQEXP kernel. The NN kernel has been able to adapt to fast changing/large discontinuities in data.

Comparing Kernels

The criteria of importance when comparing kernels is the ability of the GP using the particular kernel to adapt to the data at hand. One aspect of a GP using the NN kernel in comparison with one using an SQEXP kernel is its superior ability to respond to sparse data availability. This is due to the fact that the correlation in the NN kernel saturates. Thus, even relatively far off points could be used to make useful predictions at the point of interest. In the case of the SQEXP kernel however, the correlation decreases with distance towards zero. Thus, far off data in sparse datasets become insignificant and are not useful for making inferences at the point of interest. Such a scenario could occur in large voids due to occlusions or due to fundamental sensor limitations. These aspects of the NN kernel taken together, make it a powerful method for use in complex terrain modelling using GPs.

The Neural Network (NN) covariance function may accordingly meet the demands of modelling large scale and unstructured terrain.

2.3. Training the Gaussian Process

Training the GP for a given dataset is tantamount to optimising the hyperparameters of the underlying covariance function. This training can be done using machine learning. It can also be done manually, for example by estimating the values and performing an iterative fitting process.

For a machine learning method, the hyperparameters are optimised with respect to the relevant covariance function. For the squared-exponential covariance function, this amounts to finding the optimal set of values for $\theta = \{l_x, l_y, l_z, \sigma_f, \sigma_n\}$. For the neural network covariance function, the optimal values must be determined for $\theta = \{l_x, l_y, l_z, \sigma_f, \beta, \sigma_n\}$. This is done by formulating the problem in a Maximum Marginal Likelihood Estimation (MMLE) framework and subsequently solving a non-convex optimization problem.

A Bayesian procedure is used to maximise the log marginal likelihood of the training output (y) given the training input (X) for a set of hyperparameters $\theta$ which is given by $$\log(y \mid X, \theta) = -\frac{1}{2} y^T K_y^{-1} y - \frac{1}{2} \log|K_y| - \frac{n}{2} \log(2\pi). \quad (6)$$

where $K_y = K_f + \sigma_n^2 I$ is the covariance matrix for the noisy targets y. The log marginal likelihood has three terms—the first describes the data fit, the second term penalises model complexity and the last term is simply a normalisation coefficient. Thus, training the model will involve searching for the set of hyperparameters that enables the best data fit while avoiding overly complex models. Occam's razor is thus in-built in the system and prevention of over-fitting is guaranteed by the very formulation of the learning mechanism.

Using this maximum marginal likelihood (MMLE) approach, training the GP model on a given set of data amounts to finding an optimal set of hyperparameters that maximize the log marginal likelihood (Eq. 6). This can be done using standard off-the-shelf optimization approaches. For example, a combination of stochastic search (simulated annealing) and gradient descent (Quasi-Newton optimization with BFGS Hessian update) has been found to be successful. Using a gradient based optimization approach leads to advantages in that convergence is achieved much faster. A description and further information about these optimization techniques and others can be found in the text *Numerical Optimization*, by J. Nocedal and S. Wright (Springer, 2006), which is hereby incorporated herein by reference, 2.4. Gaussian Process Evaluation Applying the GP model amounts to using the learned GP model to estimate the elevation information across a region of interest, characterised by a grid of points at a desired resolution. The 2.5D elevation map can then be used as is or as a surface map for various applications. This is achieved by performing Gaussian Process Regression at the set of query points, given the training dataset and the GP covariance function with the learnt hyperparameters.

For additive independent identically distributed Gaussian noise with variance $\sigma_n^2$, the prior on the noisy observations becomes $$\text{cov}(y_p, y_q) = k(x_p, x_q) + \sigma_n^2 \delta_{pq} \quad (7)$$

where $\delta_{pq}$ is a Kroeneker Delta defined on p, q and is equal to 1 iff p=q and 0 otherwise.

The joint distribution of any finite number of random variables of a GP is Gaussian. Thus, the joint distribution of the training outputs $f$ and test outputs $f^*$ given this prior can be specified by $$\begin{bmatrix} y \\ f_* \end{bmatrix} \sim N\left(0, \begin{bmatrix} K(X, X) + \sigma_n^2 I & K(X, X_*) \\ K(X_*, X) & K(X_*, X_*) \end{bmatrix}\right) \quad (8)$$

The function values ($f^*$) corresponding to the test inputs ($X^*$) given the training data X, training output y and covariance function K, is given by $$\bar{f}_* = K(X_*, X)[K(X, X) + \sigma_n^2 I]^{-1} y \quad (9)$$

and their uncertainty is given by $$\text{cov}(f_*) = K(X_*, X_*) - K(X_*, X)[K(X, X) + \sigma_n^2 I]^{-1} K(X, X_*) \quad (10)$$

Denoting K(X, X) by K and K(X, X*) by K*; for a single test point x*, k(x*)=k* is used to denote the vector of covariances between the test point and the set of all training points. The above equations can then be rewritten for a single query point as:

$$\bar{f}_* = k_*^T (K + \sigma_n^2 I)^{-1} y \quad (11)$$

and $$V[f_*] = k(x_*, x_*) - k_*^T (K + \sigma_n^2 I)^{-1} k_* \quad (12)$$

Equations (11) and (12) provide the basis for the elevation estimation process. The GP estimates obtained are a best linear, unbiased estimate for the respective query points.

Uncertainty is handled by incorporating the sensor noise model in the training data. The representation produced is a multi-resolution one in that a terrain model can be generated at any desired resolution using the GP regression equations presented above. Thus, the terrain modelling approach proposed is a probabilistic, multi-resolution one that aptly handles spatially correlated information.

Although the Gaussian process modelling as described above is a powerful method, modelling large-scale stochastic processes still presents some challenges. The difficulty comes from the fact that inference in GPs is usually computationally expensive due to the need to invert a potentially large covariance matrix during inference time which has $O(N^3)$ cost. For problems with thousands of observations, exact inference in normal GPs is intractable and approximation algorithms are required.

Most of the approximation algorithms employ a subset of points to approximate the posterior distribution of a new point given the training data and hyperparameters. These approximations rely on heuristics to select the subset of points, or use pseudo targets obtained during the optimization of the log marginal likelihood of the model.

As described above, for the embodiment described here, a NN kernel is used for the GP. The next step in the GP modelling process is to estimate the hyperparameters for a given dataset. Different approaches have been attempted including a maximum marginal likelihood formulation (MMLE), generalized cross validation (GCV) and maximum a-posteriori estimation (MAP) using Markov chain Monte Carlo (MCMC) techniques. The MMLE computes the hyperparameters that best explains the training data given the chosen kernel. This requires the solution of a non-convex optimization problem and may possibly be driven to locally optimal solutions. The MAP technique places a prior on the hyperparameters and computes the posterior distribution of the test outputs once the training data is well explained. The state-of-the-art in GP based terrain modelling typically used the latter approach.

For large scale datasets, the GCV and MAP approaches may be too computationally expensive. For the embodiment of the invention described here, the learning procedure is based on the MMLE method, the use of gradients and the learning of the hyperparameters that best explains the training data through optimization techniques. Locally optimal solutions are avoided by combining a stochastic optimization procedure with a gradient based optimization. The former enables the optimizer to reach a reasonable solution and the latter focuses on fast convergence to the exact solution.

3. FAST LOCAL APPROXIMATION USING KD-TREES

The modelling that forms part of this invention also includes a local approximation methodology that addresses scalability issues and is based on a "moving window" methodology implemented using an efficient hierarchical representation of the data, a KD-Tree.

In this specification the terms nearest neighbour and "moving window" are used interchangeably and will be understood by a person skilled in the art to refer to the same concept.

Terrain data can be obtained using one or more of numerous different sources (sensors), including 3D laser scanners and GPS surveying. Three-dimensional (3D) laser scanners provide dense and accurate data whereas a GPS based survey typically comprises a relatively sparse set of well chosen points of interest. Typically, for dense and large datasets, not all of the data is required for learning the GP. Indeed, such an approach may not scale due to the computational complexity of the process. Thus, as earlier described, a sampling step may be included that can take a subset of the data. The subset of the data that is to be used for training is stored in a KD-Tree for later use in the inference process. The KD-Tree provides a mechanism for rapid data access in the inference process and addresses scalability issues related to applying the proposed method in the context of large datasets, as spatial information is preserved in the KD-Tree. A description of the KD-Tree data structure can be found, for example, in *Computational Geometry: An Introduction*, by F. P. Preparata and M. I. Shamos (Springer, 1993).

As mentioned earlier, the squared exponential kernel has a smoothing effect on the data whereas the neural-network kernel is much more effective in modelling discontinuous terrain data. In order to achieve a good trade-off between obtaining smooth terrain models and yet preserve the characteristic features in the terrain, a KD-Tree based local approximation methodology is proposed in this work.

During the inference process, the KD-Tree that initially stored the training data is queried to provide a predefined number of spatially closest training data to the point for which the elevation must be estimated. The GP regression process then uses only these training exemplars to estimate the elevation at the point of interest. The number of nearest neighbour exemplars used controls the tradeoff between smoothness and feature preservation and also the time taken for the inference process. The proposed local approximation method also bounds (by selecting a fixed number of data points) the subset of data over which the neural network kernel is applied and thus effectively uses it. Note that the GP model itself is learnt from the set of all training data but is applied locally using the KD-Tree approximation. Particularly, in the case of the neural network covariance function, this amounts to adding the benefits of a stationary covariance function to the highly adaptive power of a non-stationary covariance function. This process provides two advantages—it tends to achieve the locally adaptive GP effect as exemplified in some of the referenced prior art, and it simultaneously addresses the scalability issue that arises when applying this approach to large scale datasets.

Figure 4:
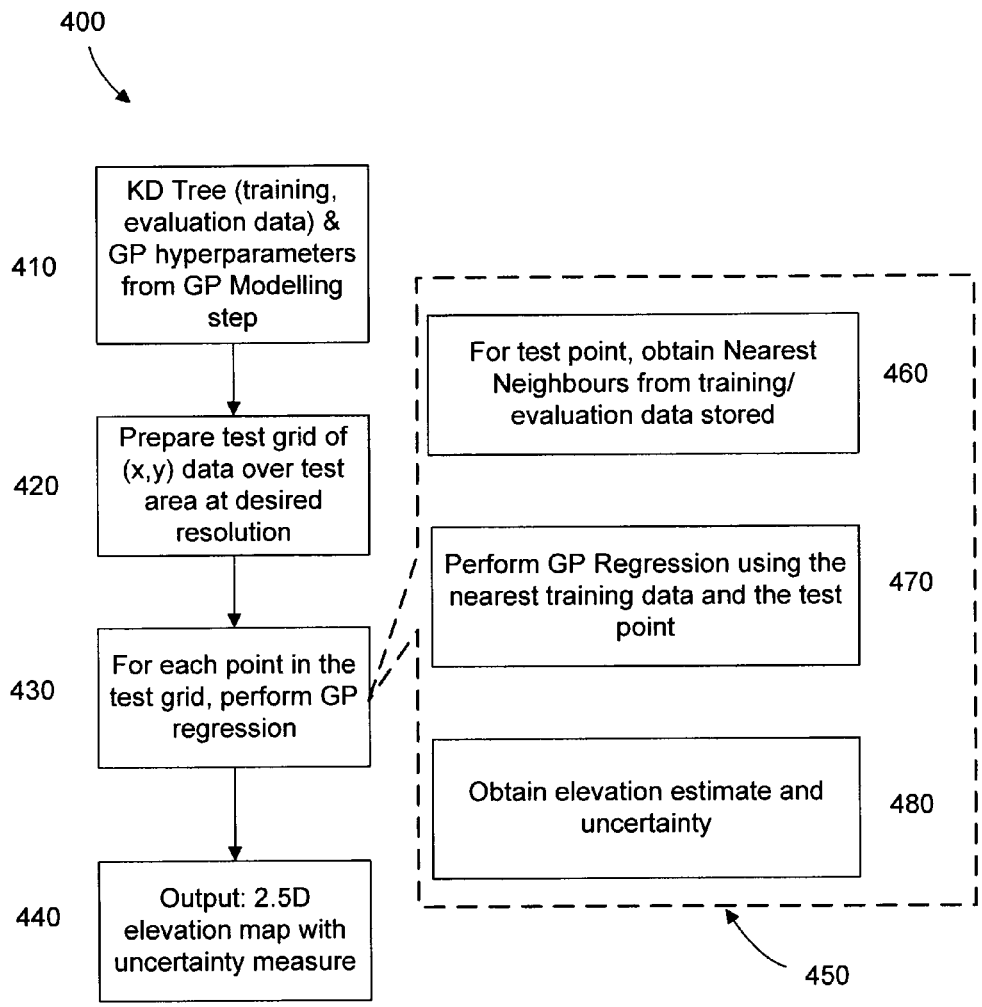
FIG. 4 is a flow-chart diagram showing an evaluation phase for a terrain data modelling process using a local approximation technique.

The process of local approximation 400 is shown in FIG. 4. At step 410 the training and evaluation data in the KD Tree and the GP hyperparameters are obtained from the GP modelling step. At step 420 a test grid of (x,y) data is prepared over the test area at a desired resolution. For each point in the test grid GP regression is performed at step 430. At step 440 the output provided is a 2.5D elevation map with an uncertainty measure. A detailed view of the GP regression step is shown at 450. The first part is shown at step 460 where, for each test point, the nearest neighbour is obtained from the training/evaluation data stored. Then at step 470 GP regression is performed using the nearest training data and the test point. Finally at step 480 an elevation estimate and uncertainty is obtained.

By way of example, a dataset of N (for example, 1 million) points may be split into for instance $n_{train}$ (say, 3000) training points, $n_{test}$ (say, 100000) test points and the remaining $n_{eval}$ (897000) are evaluation points. The training points are those over which the GP is learnt, the test points are those over which the error, for example the mean square error (MSE), is evaluated and the evaluation points together with the training points are used to make predictions at the test points. The KD-Tree data structure would thus comprise of a total of $n_{train}+n_{eval}$ points (a total of 900000 training and evaluation data). The complexity in the absence of the approximation strategy would be $O(n_{train}+n_{eval})^3$ for each of the $n_{test}$ points.

However, with the proposed local approximation strategy, a predefined number m of spatially closest training and evaluation points is used to make a prediction at any point of interest. Typically, $m \ll n_{train}+n_{eval}$. For instance, for the dataset of N a neighbourhood size of 100 points may be used. Thus the computational complexity would significantly decrease to $O(m^3)$ for each of the $n_{test}$ points to be evaluated.

The KD-Tree is a convenient hierarchical data structure used to implement a fast "moving window" based local approximation method. Alternative appropriate data structures could be used which support use of the local neighbourhood of a test point.

The local approximation strategy defines the neighbourhood over which the interpolation takes place and hence can serve as a control parameter to balance local smoothness with feature preservation in terrain modelling. The method of choosing the nearest neighbours can also be used to the same effect. For instance, 100 nearest neighbours mutually separated by a point will produce much smoother outputs as compared to the 100 immediate neighbours. The local approximation method can thus be used as a control or tradeoff mechanism between locally smooth outputs and feature preservation.

The local approximation strategy is also useful in the application of the neural network kernel (NN). The NN kernel is capable of seamlessly adapting to rapidly and largely changing data. However, it also has the property that depending on the location of the origin and that of the data points with respect to it, the correlation increases with distance until it saturates. Particularly in the saturation region, the kernel is able to respond to discontinuous data very effectively as the correlation values become similar. However, this also implies that two distant points lying in the saturation region will be correlated. The proposed local approximation method acts as a bounding mechanism for the applicability of the kernel. This is because the NN only acts on the immediate neighbourhood of the data, over which it is extremely effective in adapting. In the case of the neural network kernel, this amounts to adding the benefits of a stationary kernel to the highly adaptive power of a non-stationary kernel. Thus, the proposed local approximation methodology attempts to emulate the locally adaptive GP effect exemplified by the works.

4. APPLICATION EXAMPLES

Experiments were performed on three large scale data sets representative of different sensory modalities.

The first data set comprises of a scan from a RIEGL LMSZ420 laser scanner at the Mt. Tom Price mine in Western Australia. The data set consists of over 1.8 million points (in 3D) spread over an area of 135×72 sq m, with a maximum elevation difference of about 13.8 m. The scan has both numerous voids of varying sizes as well as noisy data, particularly around the origin of the scan. The data set used is referred to as the "Tom Price" data set.

The second data set comprises a mine planning dataset, that is representative of a GPS based survey, from a large Kimberlite (diamond) mine: This data set is a very hard one in that it contains very sparse information (4612 point in total; the average spread of the data is about 33 m in x and y directions) spread over a very large geographical area (≈2.2×2.3 sq km), with a significant elevation of about 250 m. The data set is referred to as the "Kimberlite Mine" data set.

A third data set also consists of a laser scan but over a much larger area than the first data set. This dataset is referred to as the "West Angelas" dataset. It comprises of about 534,460 points spread over 1.865×0.511 sq km. The maximum elevation of this dataset is about 190 m. This dataset is both rich in features (step-like wall formations, voids of varying sizes) as well as large in scale; a large part of the dataset is composed of only sparse data.

The focus of the experiments is three-fold. The first part will demonstrate GP terrain modelling and evaluate the non-stationary NN kernel against the stationary SQEXP kernel for this application. The second part will detail results from extensive cross-validation experiments done using all three datasets that aim to statistically evaluate the performance of the stationary and non-stationary GP and also compare them with other methods of interpolating data, even using alternative representations. This part aims at understanding how they compare against each other on the test datasets and which would be more effective in what circumstances. The last part will detail experiments that help understand finer aspects of the GP modelling process and explain some of the design decisions in this work—these include the choice of using two optimization techniques or 100 nearest neighbours for instance.

In all experiments, the mean squared error (MSE) criterion was used as the performance metric (together with visual inspection) to interpret the results. Each dataset was split into three parts—training, evaluation and testing. The formermost one was used for learning the GP and the latter was used only for computing the mean squared error (MSE); the former two parts together were used to estimate the elevations for the test data. The mean squared error was computed as the mean of the squared differences between the GP elevation prediction at the test points and the ground truth specified by the test data subset.

4.1. Stationary Vs Non-Stationary GP Terrain Modelling

In the first set of experiments, the objective was to understand if GPs could be successfully used for a terrain modelling task, the benefits of using them and if the non-stationary (neural network) or stationary (squared exponential) kernel was more suited for terrain modelling.

The results of GP modelling of the three data sets using are summarized in the following 3 tables:

TABLE 1

Kernel performance Toni Price dataset

| Kernel | Mean Squared Error (MSE) (sq m) |
| --- | --- |
| Squared Exponential (SQEXP) | 0.0136 |
| Neural Network (NN) | 0.0137 |

TABLE 2

Kernel performance Kimberlite Mine dataset

| Kernel | Number of training data | Mean Squared Error (MSE) (sq m) |
| --- | --- | --- |
| Squared Exponential (SQEXP) | 1000 | 13.014 (over 3612 points) |
| Neural Network (NN) | 1000 | 8.870 (over 3612 points) |
| Squared Exponential (SQEXP) | 4512 | 4.238 (over 100 points) |
| Neural Network (NN) | 4512 | 3.810 (over 100 points) |

TABLE 3

Kernel performance West Angeles dataset

| Kernel | Mean Squaxed Error (MSE) (sq m) |
| --- | --- |
| Squared Exponential (SQEXP) | 0.690 |
| Neural Network (NN) | 0.019 |

The tests compared the stationary SQEXP kernel and the non-stationary NN kernel for GP modelling of large scale mine terrain data. Overall, the NN kernel outperformed the SQEXP and proved to be more suited to the terrain modelling task. In the case of the Tom Price dataset, as the dataset is relatively flat, both kernels performed relatively well. The Kimberlite Mine dataset being sparse, was better modelled by the NN kernel. The West Angelas dataset was more challenging in that it had large voids, large elevation and sparse data. The NN kernel clearly outperformed the SQEXP kernel.

Further, not only was its MSE lower than that of the SQEXP but the MSE values were comparable to the known sensor noise of the RIEGL scanner.

The experiments successfully demonstrated Gaussian process modelling of large scale terrain. Further, the SQEXP and NN kernel were compared. The NN kernel proved to be much better suited to modelling complex terrain as compared to the SQEXP kernel. The kernels performed very similarly on relatively at data. Thus, the approach can 1. Model large scale sensory data acquired at different degrees of sparseness.
2. Provide an unbiased estimator for the data at any desired resolution.
3. Handle sensor incompleteness by providing an unbiased estimates of data that are unavailable (due to occlusions for instance). Note that no assumptions on the structure of the data are made, a best prediction is made using only the data at hand.
4. Handle sensor uncertainty by modelling the uncertainty in data in a statistically sound manner.
5. Handle spatial correlation between data.

The result is a compact, non-parametric, multi-resolution, probabilistic representation of the large scale terrain that appropriately handles spatially correlated data as well as sensor incompleteness and uncertainty.

4.2. Statistical Performance Evaluation, Comparison and Analyses

The next set of experiments that were conducted were aimed at

1. Evaluating the GP modelling technique in a way that provides for statistically representative results.
2. Providing benchmarks to compare the proposed GP approach with grid/elevation maps using several standard interpolation techniques as well as TIN's using triangle based interpolation techniques.
3. Understanding the strengths and applicability of different techniques.

The method adopted to achieve these objectives was to perform cross validation experiments on each of the three datasets and interpret the results obtained. The GP modelling using the SQEXP and NN kernels are compared with each other as well as with parametric, non-parametric and triangle based interpolation techniques. A complete list and description of the techniques used in this experiment is included below.

1. GP modelling using SQEXP and NN kernels (the method of the embodiment of this invention as described above).
2. Parametric interpolation methods—These methods attempt to fit the given data to a polynomial surface of the chosen degree. The polynomial coefficients, once found, can be used to interpolate or extrapolate as required. The parametric interpolation techniques used here include linear (plane fitting), quadratic and cubic.
   (a) Linear (plane fitting)—A polynomial of degree 1 (plane in 2D) is fit to the given data. The objective is to find the coefficients $\{a_i\}_i^2 = 0$ for the equation $$z = a_0 + a_1 x + a_2 y$$

that best describes the given data by minimizing the residual error,
   (b) Quadratic fitting—A polynomial of degree 2 is fit to the given data. The objective is to find the coefficients $\{a_i\}_i^5 = 0$ for the equation $$z = a_0 + a_1 x + a_2 y + a_3 x^2 + a_4 xy + a_5 y^2$$

that best describes the given data by minimizing the residual error.
   (c) Cubic fitting—A polynomial of degree 3 is fit to the given data. The objective is to find the coefficients $\{a_i\}_i^9 = 0$ for the equation $$z = a_0 + a_1 x + a_2 y + a_3 x^2 + a_4 xy + a_5 y^2 + a_6 x^3 + a_7 x^2 y + a_8 xy^2 + a_9 y^3$$

that best describes the given data by minimizing the residual error.
3. Non-parametric interpolation methods—These techniques attempt to fit a smooth curve through the given data and do not attempt to characterize all of it using a parametric form, as was the case with the parametric methods. They include piecewise linear or cubic interpolation, biharmonic spline interpolation as well as techniques such as nearest neighbour interpolation and mean-of-neighbourhood interpolation.
   (a) Piecewise linear interpolation—In this method, the data is gridded (associated with a suitable mesh structure) and for any point of interest, the 4 points of its corresponding grid cell are determined. A bilinear interpolation of these 4 points yields the estimate at the point of interest. This interpolation basically uses the form:

$$z = a_0 + a_1 x + a_2 y + a_3 xy$$

where the coefficients are expressed in terms of the coordinates of the grid cell. It is thus truly linear only if its behaviour is considered keeping one variable/dimension fixed and observing the other. It is also called linear spline interpolation wherein n+1 points are connected by n splines such that (a) the resultant spline would constitute a polygon if the begin and end points were identical and (b) the splines would be continuous at each data point.
   (b) Piecewise cubic interpolation—This method extends the piecewise linear method to cubic interpolation. It is also called cubic spline interpolation wherein n+1 points are connected by n splines such that (a) the splines are continuous at each data point and (b) the spline functions are twice continuous differentiable, meaning that both the first and second derivatives of the spline functions are continuous at the given data points. The spline function also minimizes the total curvature and thus produces the smoothest curve possible. It is akin to constraining an elastic strip to fit the given n+1 points.
   (c) Biharmonic spline interpolation—The biharmonic spline interpolation places Green functions at each data point and finds coefficients for a linear combination of these functions to determine the surface. The coefficients are found by solving a linear system of equations. Both the slope and the values of the given data are used to determine the surface. The method is known to be relatively inefficient, possibly unstable but flexible (in the sense of the number of model parameters) in relation to the cubic spline method. In one or two dimensions, this is known to be equivalent to the cubic spline interpolation as it also minimizes the total curvature.
   (d) Nearest-neighbour interpolation—This method uses the elevation estimate of the nearest training/evaluation data as the estimate of the point of interest.
   (e) Mean-of-neighbourhood interpolation—This method uses the average elevation of the set of training/evaluation data as the estimate of the point of interest.
4. Triangle based interpolation—All techniques mentioned thus far are applied on the exact same neighbourhood of training and evaluation data that is used for GP regression for any desired point. In essence, thus far, the comparison can be likened to one of comparing GPs with standard elevation maps using any of the aforementioned techniques, applied over exactly the same neighbourhoods. Two other interpolation techniques are also considered for comparison: triangle based linear and cubic interpolation. These methods work on datasets that have been triangulated and involve fitting planar or polynomial (cubic) patches to each triangle. They are meant to compare the proposed GP approach with a TIN representation of the dataset, using the triangle based interpolation techniques.
   (a) Triangle based linear interpolation—In this method, a Delaunay triangulation is performed on the data provided and then the coordinates of the triangle corresponding to the point of interest (in Barycentric coordinates) are subject to linear interpolation to estimate the desired elevation.
   (b) Triangle based cubic interpolation—In this method, a Delaunay triangulation is performed on the data provided and then the coordinates of the triangle corresponding to the point of interest (in Barycentric coordinates) are subject to cubic interpolation to estimate the desired elevation.

A 10-fold cross validation was conducted using each dataset. Two kinds of cross validation techniques were considered—using uniform sampling to define the folds and using patch sampling to define the folds. In the uniform sampling method, each fold had approximately the same number of points and points were selected through a uniform sampling process—thus, the cross validation was also stratified in this sense. This was performed for all three datasets. Further to this, the patch sampling based cross validation was conducted for the two laser scanner datasets. In this case, the data was gridded into 5 m (for Tom Price dataset) or 10 m (for West Angelas dataset) patches. Subsequently a 10 fold cross validation was performed by randomly selecting different sets of patches for testing and training in each cycle. The uniform sampling method was meant to evaluate the method as such. The patch sampling method was done with a view of testing the different techniques for their robustness to handling occlusions or voids in data.

The results of the cross validation with uniform sampling experiments are summarized in the following 3 tables.

TABLE 4

Tom Price dataset 10-fold cross validation with uniform sampling

| Interpolation Method | 1000 test data per fold | | 10000 test data per fold | |
|---|---|---|---|---|
| | Mean MSE (sq m) | Std. Dev. MSE (sq m) | Mean MSE (sq m) | Std. Dev. MSE (sq m) |
| GP Neural Network | 0.0107 | 0.0012 | 0.0114 | 0.0004 |
| GP Squared Exponential | 0.0107 | 0.0013 | 0.0113 | 0.0004 |
| Nonparametric Linear | 0.0123 | 0.0047 | 0.0107 | 0.0013 |
| Nonparametric Cubic | 0.0137 | 0.0053 | 0.0120 | 0.0017 |
| Nonpararnetric Biharmonic | 0.0157 | 0.0065 | 0.0143 | 0.0019 |
| Nonparametric Mean-of-neighborhood | 0.0143 | 0.0010 | 0.0146 | 0.0007 |
| Nonparametric Nearet-neighbor | 0.0167 | 0.0066 | 0.0149 | 0.0017 |
| Parametric Linear | 0.0107 | 0.0013 | 0.0114 | 0.0005 |
| Parametric Quadratic | 0.0110 | 0.0018 | 0.0104 | 0.0005 |
| Parametric Cubic | 0.0103 | 0.0018 | 0,0103 | 0.0005 |
| Triangulation Linear | 0.0123 | 0.0046 | 0.0107 | 0.0013 |
| Triangulation Cubic | 0.0138 | 0.0053 | 0.0120 | 0.0017 |

TABLE 5

Kimberlite Mine dataset 10-fold cross validation with uniform sampling

| Interpolation Method | Mean MSE (sq m) | Std. Dev. MSE (sq m) |
|---|---|---|
| GP Neural Network | 3.9290 | 0.3764 |
| GP Squared Exponential | 5.3278 | 0.3129 |
| Nonparametric Linear | 5.0788 | 0.6422 |
| Nonparametric Cubic | 5.1125 | 0.6464 |
| Nonparametric Biharmonic | 5.5265 | 0.5801 |
| Nonparametric Mean-of-neighborhood | 132.5097 | 2.9112 |
| Nonparametric Nearest-neighbor | 20.4962 | 2.5858 |
| Parametric Linear | 43.1529 | 2.2123 |
| Parametric Quadratic | 13.6047 | 0.9047 |
| Parametric Cubic | 10.2484 | 0.7282 |
| Triangulation Linear | 5.0540 | 0.6370 |
| Triangulation Cubic | 5.1091 | 0.6374 |

TABLE 6

West Angelas dataset 10-fold cross validation with uniform sampling

| Interpolation Method | 1000 test data per fold | | 10000 test data per fold | |
|---|---|---|---|---|
| | Mean MSE (sq m) | Std. Dev. MSE (sq m) | Mean MSE (sq m) | Std. Dev. MSE (sq m) |
| GP Neural Network | 0.0166 | 0.0071 | 0.0219 | 0.0064 |
| GP Squared Exponential | 0.4438 | 1.0289 | 0.7485 | 0.7980 |
| Nonparametric Linear | 0.0159 | 0.0075 | 0.0155 | 0.0021 |
| Neuparametric Cubic | 0.0182 | 0.0079 | 0.0161 | 0.0021 |
| Nonparametric Biharmonic | 0.0584 | 0.0328 | 0.1085 | 0.1933 |
| Nonparametric Mean-of-neighborhood | 0.9897 | 0.4411 | 0.9158 | 0.0766 |
| Nonparametric Nearest-neighbor | 0.1576 | 0.0271 | 0.1233 | 0.0048 |
| Parametric Linear | 0.1010 | 0.0951 | 0.0027 | 0.0173 |
| Parametric Quadratic | 0.0468 | 0.0130 | 0.0390 | 0.0059 |
| Parametric Cubic | 0.0341 | 0.0109 | 0.0288 | 0.0038 |
| Triangulation Linear | 0.0162 | 0.0074 | 0.0157 | 0.0022 |
| Triangulation Cubic | 0.0185 | 0.0078 | 0.0166 | 0.0023 |

The tabulated results depict the mean and standard-deviation in MSE values obtained across the 10 folds of testing performed.

The results of the cross validation with patch sampling experiments performed on the Tom Price and West Angelas datasets are summarized in the following tables.

TABLE 7

Tom Price dataset 10-fold cross validation with patch sampling

| Interpolation Method | 1000 test data per fold | | 10000 test data per fold | |
| --- | --- | --- | --- | --- |
| | Mean MSE (sq m) | Std. Dev. MSE (sq m) | Mean MSE (sq m) | Std. Dev. MSE (sq m) |
| GP Neural Network | 0.0104 | 0.0029 | 0.0100 | 0.0021 |
| GP Squared Exponential | 0.0103 | 0.0029 | 0.0099 | 0.0021 |
| Nonparametric Linear | 0.0104 | 0.0047 | 0.0098 | 0.0040 |
| Nonparametric Cubic | 0.0114 | 0.0054 | 0.0108 | 0.0045 |
| Nonparametric Biharmonic | 0.0114 | 0.0046 | 0.0124 | 0.0047 |
| Nouparanwtrie Mean-of-neighborhood | 0.0143 | 0.0036 | 0.0142 | 0.0026 |
| Nonparametric Nearest-neighbor | 0.0139 | 0.0074 | 0.0132 | 0.0048 |
| Parametric Linear | 0.0103 | 0.0029 | 0.0100 | 0.0021 |
| Parametric Quadratic | 0.0099 | 0.0029 | 0.0091 | 0.0022 |
| Parametric Cubic | 0.0097 | 0.0027 | 0.0605 | 0.1072 |
| Triangulation Linear | 0.0104 | 0.0047 | 0.0098 | 0.0039 |
| Triangulation Cubic | 0.0114 | 0.0054 | 0.0108 | 0.0045 |

TABLE 8

West Angelas dataset 10-fold cross validation with patch sampling

| Interpolation Method | 1000 test data per fold | | 10000 test data per fold | |
| --- | --- | --- | --- | --- |
| | Mean MSE (sq m) | Std. Dev. MSE (sq m) | Mean MSE (sq m) | Std. Dev. MSE (sq m) |
| GP Neural Network | 0.0286 | 0.0286 | 0.0291 | 0.0188 |
| GP Squared Exponential | 0.7224 | 1.1482 | 1.4258 | 2.0810 |
| Nonparametric Linear | 0.0210 | 0.0168 | 0.0236 | 0.0161 |
| Nonparernetric Cubic | 0.0229 | 0.0175 | 0.0243 | 0.0165 |
| Nonparametric Biharmonic | 0.0555 | 0.0476 | 0.0963 | 0.0795 |
| Nonparametric Mean-of-neighborhood | 1.6339 | 0.8907 | 1.7463 | 1.2831 |
| Nonparametric Nearest-neighbor | 0.1867 | 0.0905 | 0.2248 | 0.1557 |
| Parametric Linear | 0.1400 | 0.0840 | 0.1553 | 0.1084 |
| Parametric Quadratic | 0.0612 | 0.0350 | 0.0658 | 0.0434 |
| Parametric Cubic | 0.0380 | 0.0196 | 0.0752 | 0.0880 |
| Triangulation Linear | 0.0212 | 0.0169 | 0.0235 | 0.0160 |
| Triangulation Cubic | 0.0232 | 0.0175 | 0.0245 | 0.0164 |

In each of these tests, the GP representation with its Kriging interpolation technique, stationary or non-stationary kernel and local approximation strategy is compared with elevation maps using various parametric, non-parametric interpolation techniques as well as the exact same local approximation method as the GP and also with TINs using triangle based interpolation techniques. The former two approaches thus operate on exactly the same neighbourhood of training/evaluation data during the estimation/interpolation process. In order to compare the proposed GP modelling approach with a TIN representation, the local approximation is not applied on the latter class of interpolation techniques.

From the experimental results presented, many inferences on the applicability and usage of different techniques could be drawn. The results obtained validate the findings from the previous set of experiments. They show that the NN kernel is much more effective at modelling terrain data than the SQEXP kernel. This is particularly true in relatively sparse and/or complex datasets such as the Kimberlite Mine or West Angelas datasets.

For relatively flat terrain such as the Tom Price scan data, the techniques compared performed more or less similarly. From the GP modelling perspective, the choice of nonstationary or stationary kernel was less relevant in such a scenario. The high density of data in the scan was likely another contributive factor.

For sparse datasets such as the Kimberlite Mine dataset, GP-NN easily outperformed all the other interpolation methods. This is quite simply because most other techniques imposed apriori models on the data whereas the GP-NN was actually able to model and adapt to the data at hand much more effectively. Further, GP SQEXP is not as effective as the GP-NN in handling sparse or complex data.

In the case of the West Angelas dataset, the data was complex in that it had a poorly defined structure and large areas of the data were sparsely populated. This was due to large occlusions as the scan was a bottom-up scan from one end of the mine pit However, the dataset spanned over a large area and local neighbourhoods (small sections of data) were relatively at. Thus, while the GP-NN clearly outperformed the GP-SQEXP, it performed comparably with the piecewise linear/cubic and triangle based linear/cubic methods and much better than the other techniques attempted. Thus, even in this case, the GP-NN proved to be a very competitive modelling option. GP-SQEXP was not able to handle sparse data or the complex structure (with an elevation difference of 190 m) effectively and hence performed poorly in relation to the aforementioned methods.

The non-parametric and triangle based linear/cubic interpolation techniques performed much better than the parametric interpolation techniques, which fared poorly overall. This is expected and intuitive as the parametric models impose apriori models over the whole neighbourhood of data whereas the non-parametric and triangle based techniques basically split the data into simplexes (triangular or rectangular patches) and then operate only one such simplex for a point of interest. Thus their focus is more towards smooth local data fitting. The parametric techniques only performed well in the Tom Price dataset tests due to the at nature of the dataset. Among the nonparametric techniques, the linear and cubic also performed better than the others. The nearest-neighbour and mean-of-neighbourhood methods were too simplistic to be able to handle any complex or sparse data.

The results show that the GP-NN is a very versatile and competitive modelling option for a range of datasets, varying in complexity and sparseness. For dense datasets or relatively at terrain (even locally at terrain), the GP-NN will perform as well as the standard grid based methods employing any of the interpolation techniques compared or a TIN based representation employing triangle based linear or cubic interpolation. For sparse datasets or very bumpy terrain, the GP-NN will significantly outperform every other technique that has been tested in this experiment. When considering the other advantages of the GP approach such as Bayesian model fitting, ability to handle uncertainty and spatial correlation in a statistically sound manner and multi-resolution representation of data, the GP approach to terrain representation seems to have a clear advantage over standard grid based or TIN based approaches.

These experiments compared the GP-Kriging interpolation technique with various other standard interpolation methods. The GP modelling approach can use any of the standard interpolation techniques through the use of suitably chosen/designed kernels. For instance, a GP-linear kernel performs the same interpolation as a linear interpolator, however, the GP also provides the corresponding uncertainty estimates among other things. The GP is more than just an interpolation technique. It is a Bayesian framework that brings together interpolation, linear least squares estimation, uncertainty representation, non-parametric continuous domain model fitting and the Occam's Razor principle (thus preventing the over-fitting of data). Individually, these are well known techniques; the GP provides a flexible (in the sense of using different kernels) technique to do all of them together.

Thus, this set of experiments statistically evaluated the proposed GP modelling approach, compared stationary and non-stationary GPs for terrain modelling, compared the GP modelling/Kriging interpolation approach to elevation maps using many standard interpolation techniques as well as TIN representations using triangle based interpolation techniques.

4.3. Further Analysis

These further experiments were mostly conducted on the Kimberlite Mine data set owing to its characteristic features (gradients, roadways, faces etc.). Only small numbers of training data have been used in these experiments in order to facilitate rapid computation. The mean squared error values will thus obviously not be near the best case scenario, however the focus of these experiments was not on improving accuracy but rather on observing trends and understanding dependencies.

Among the experiments performed, three different optimization strategies were attempted—stochastic (simulated annealing), gradient based (Quasi-Newton optimization with BFGS Hessian update) and the combination (first a simulated annealing, followed by the Quasi-Newton optimization with the output of the previous stage being the input to this one). The results obtained are shown in the table below:

TABLE 9

Optimization Strategy-GP-NN applied on Kimberlite Mine data set

| Optimization Method | Mean Squared Error (sq m) |
| --- | --- |
| Stochastic (Simulated Annealing) | 94.30 |
| Gradient based (Quasi-Newton Optimization) | 150.48 |
| Combined | 4.61 |

The objective of this experiment was to start from a random set of hyper-parameters and observe which method converges to a better solution. It was found that the combined strategy performed best. The gradient based optimization requires a good starting point or the optimizer may get stuck in local minima. The stochastic optimization (simulated annealing) provides a better chance to recover from local minima as it allows for "jumps" in the parameter space during optimization. Thus, the combination first localizes a good parameter neighbourhood and then zeros-down on the best parameters for the given scenario.

Three different sampling strategies have been attempted in this work—uniform sampling, random sampling, heuristic sampling (implemented here as a preferential sampling around elevation gradients). All experiments have been performed using a uniform sampling strategy as it performed the best.

The three sampling strategies were specifically tested on the Kimberlite Mine data set owing to its significant elevation gradient. The results obtained are shown in the table below:

TABLE 10

Sampling Strategy-GP-NN applied on Kimberlite Mine data

| Method | Number(Train Data) = 1000 Mean Squared Error (sq m) | Number(Train Data) = 1500 Mean Squared Error (sq m) |
| --- | --- | --- |
| Uniform | 8.87 | 5.87 |
| Random | 10.17 | 7.89 |
| Heuristic | 32.55 | 11.48 |

Heuristic sampling did poorly in comparison to the other sampling methods because of the fact that the particular gradient based sampling approach applied here resulted in the use of mostly gradient information and little or no face information. Increasing the number of training data increases the number of face related data points and reduces the amount of error. At the limit (number of training data=number of data), all three approaches would produce the same result.

The number of nearest neighbours used for the local approximation step in the inference process is another important factor influencing the GP modelling process. Too many nearest neighbours results in excessive "smoothing" of the data whereas too few of them would result in a relatively "spiky" output. Further, the greater the number of neighbours considered, the more the time it takes to estimate/interpolate the elevation (an increase in computational complexity). The "correct" number of nearest neighbours was determined by computing the MSE for different neighbourhood sizes and interpreting the results. This experiment was conducted on both the Kimberlite Mine and the West Angelas datasets. The results of this experiment are shown in the following two tables:

TABLE 11

GP-NN applied on Kimberlite Mine data set
(3000 training data, 1000 test data)

| Number of Neighbors | MSE (sq m) |
|---|---|
| 10 | 4.5038 |
| 50 | 4.2214 |
| 100 | 4.1959 |
| 150 | 4.1859 |
| 200 | 4.1811 |
| 250 | 4.1743 |
| 300 | 4.1705 |
| 350 | 4.1684 |
| 400 | 4.1664 |
| 450 | 4.1652 |
| 500 | 4.1642 |
| 550 | 4.1626 |

TABLE 12

GP-NN applied on West Angelas mine data set
(3000 training data 1000 test data)

| Number of Neighbors | MSE (sq m) |
|---|---|
| 10 | 0.082 |
| 50 | 0.017 |
| 100 | 0.020 |
| 150 | 0.023 |
| 200 | 0.026 |
| 250 | 0.027 |
| 300 | 0.028 |

With an aim of (a) choosing a reasonable sized neighbourhood, (b) obtaining reasonably good MSE performance and time complexity and (c) if possible, using a single parameter across all experiments and datasets, a neighbourhood size of 100 was used in this work.

The size of the training data is obviously an important factor influencing the modelling process. However, this depends a lot on the data set under consideration. For the Tom Price laser scanner data, a mere 3000 of over 1.8 million data points were enough to produce centimeter level accuracy. This was due to the fact that this particular data set comprised of dense and accurate scanner data with a relatively lower change in elevation. The same number of training data also produced very satisfactory results in the case of the West Angelas dataset which is both large and has a significant elevation gradient—this is attributed to the uniform sampling of points across the whole dataset and adaptive power of the NN kernel. The Kimberlite Mine data set comprised of very sparse data spread over a very large area. This data set also had a lot of "features" such as roads, "crest-lines" and "toe-lines". Thus, if the amount of training data is reduced (say 1000 of the 4612), while the terrain was still broadly reconstructed, the finer details—faces, lines, roads etc. were smoothened out. Using nearly the entire data set for training and then reconstructing the elevation/surface map at the desired resolution provided the best results.

A combination of stochastic (simulated annealing) and gradient based (Quasi-Newton) optimization was found to be the best option to obtain the GP hyperparameters.

For most datasets and particularly for dense and large ones, a uniform sampling procedure was a good option. For feature rich datasets, a heuristic sampling might be attempted but care must be taken to ensure that training data from the non-feature-rich areas are also obtained. The number of nearest neighbours affected both the time complexity as well as the MSE performance. A trade-off between these was applied to empirically determine that the experiments would use 100 nearest neighbours. Finally, the number of training data depends on the computational resources available and on the richness of the dataset. A dataset such as the Kimberlite Mine dataset needed more training data than the Tom Price dataset.

5. ADVANTAGES OF THE INVENTION

This invention addresses the use of Gaussian Processes for modelling large scale and complex terrain. The GP representation naturally provides a multi-resolution representation of large scale terrain, effectively handles both uncertainty and incompleteness in a statistically sound way and provides a powerful basis to handle correlated spatial data in an appropriate manner. Experiments performed on a simulated and real sensor data validated these aspects.

Prior art digital terrain representations generally do not have a statistically sound way of incorporating and managing uncertainty. The assumption of statistically independent measurement data is a further limitation of many of many works that have used these approaches. While there are several interpolation techniques known, the independence assumption can lead to simplistic (simple averaging like) techniques that result in an inaccurate modelling of the terrain. Further, the limited perceptual capabilities of sensors renders most sensory data incomplete.

The method of this invention incorporates sensor uncertainty and uses it for learning the terrain model. Estimation of data at unknown locations is treated as a regression problem in 3D space and takes into account the correlated nature of the spatial data.

This technique is also used to overcome sensor limitations in that gaps in sensor data can be filled with the best linear unbiased estimates given the model of the data. The representation is a continuous domain, compact and nonparametric representation of the terrain and hence can readily be used to create terrain maps at any required resolution.

The foregoing description shows that a single non-stationary kernel (neural-network) Gaussian Process is successfully able to model large scale and complex terrain data taking into account the local smoothness as well as preserving much of the spatial features in the terrain. A further contribution to this effect is a local approximation methodology based on a "moving-window" methodology and implemented using KD-Trees. This incorporates the benefits of the use of stationary and non-stationary kernel in the elevation estimation process. The use of the KD-Tree based local approximation technique also enables this work to take into account scalability considerations for handling large scale, complex terrain so that very large datasets can be accommodated. The end-result is a multi-resolution representation of space that incorporates and manages uncertainty in a statistically sound way and also handles spatial correlations between data in an appropriate manner.

Experiments conducted on real sensor data obtained from GPS and Laser scanner based surveys in real application scenarios (mining) clearly suggest the viability of the proposed representation.

Cross validation experiments were used to provide statistically representative performance measures, compare the GP approaches with several other interpolation methods using both grid/elevation maps as well as TIN's and understand the strengths and applicability of different techniques. These experiments demonstrated that for dense and/or relatively at terrain, the GP-NN would perform as well as the grid based methods using any of the standard interpolation techniques or TIN based methods using triangle based interpolation techniques. However, for sparse and/or complex terrain data, the GP-NN would significantly outperform alternative methods. Thus, the GP-NN proved to be a very versatile and effective modelling option for terrain of a range of sparseness and complexity. Experiments conducted on multiple real sensor data sets of varying sparseness, taken from a mining scenario clearly validated the claims made. The data sets included dense laser scanner data and sparse mine planning data that was representative of a GPS based survey. Not only are the kernel choice and local approximation method unique to this work on terrain modelling, the approach as a whole is novel in that it addressed the problem at a scale never attempted before with this particular technique.

The model obtained naturally provided a multi-resolution representation of large scale terrain, effectively handled both uncertainty and incompleteness in a statistically sound way and provided a powerful basis to handle correlated spatial data in an appropriate manner. The Neural Network kernel was found to be much more effective than the squared exponential kernel in modelling terrain data. Further, the various properties of the neural network kernel including its adaptive power and of being a universal approximator make it an excellent choice for modelling data, particularly when no apriori information (eg, the geometry of the data) is available or when data is sparse, unstructured and complex. This has been consistently demonstrated throughout this paper. Where domain information is available (eg. a flat surface), a domain specific kernel (eg. linear kernel) may perform well but the NN kernel would still be very competitive. Thus, this work also suggests further research in the area of kernel modelling—particularly combinations of kernels and domain specific kernels.

In summary, the non-parametric, probabilistic, multi-scale approach to representing and interpolating large scale terrain data presented herein provides a number of advantageous features, including:

(1) The ability to model spatial data on the scale of a mine.
  The method provides the ability to model spatial data of very large sizes. This ability is exemplified by (but not limited to) the ability of the method to model data that survey mines.
(2) The ability to learn, represent large scale spatial data using only a subset of it.
  The method uses only a small subset of a very large dataset to learn, represent and interpolate the spatial data. Any of the sampling techniques may be used. Examples include (and are not limited to) random, uniform and informed/heuristic (sampling around areas of high gradient) sampling techniques.
(3) Use of an efficient data structure for storing spatial data.
  Data used to learn the terrain model is stored in an efficient data structure for storage of spatial data—KD-Trees. The use of this data structure enables rapid data access during the application of this methodology. Other data structures may also be used as the method is generic.
(4) The ability to learn models of large scale spatial data.
  The method provides the ability to model and represent large scale terrain data.
(5) A non-parametric, probabilistic, multi-scale representation of data.
  The method provides a non-parametric representation of the data in that no explicit assumption is made on the underlying functional model of the data. The representation produced is probabilistic in that it explicitly encodes (in a statistically sound way) an uncertainty estimate for all spatial data represented.
(6) The use of non-stationary kernels to model large scale spatial data.
  The method employs non-stationary kernels to model the spatial variation in the dataset. The use of these kernels provides the ability to work with discontinuities in data.
(7) The ability to interpolate spatial data in regions containing voids.
  The method provides an ability to interpolate spatial data in regions that contain voids. These voids may occur due to various reasons including (but not limited to) sensor limitations and the configuration of the space to be modeled.
(8) The ability to segment and fuse partial models of the whole model.
  The method provides a strong and statistically sound framework for the segmentation and fusion of partial/local models of spatial data.
(9) The ability to handle spatially correlated data.
  This method provides the ability to incorporate or use spatially correlated data. The method is thus able to account for the fact that data in a region will depend on data from other regions. State of the art algorithms typically assume statistical independence as a way of simplifying the modelling problem.
(10) The ability of handle spatial data from different sensors.
  The method provides for a statistically sound framework to incorporate and use spatial information from different sensory modalities.
(11) The ability to handle noisy spatial data appropriately.
  The method incorporates and manages (in a statistically sound way) an uncertainty measure for all modelled spatial data. Thus, this approach can work with any sensor of spatial data—noisy or good quality ones. Further, the approach also has the ability to filter out noise in the output (digital elevation/surface maps) it generates.

Although not required, the embodiments described herein can be implemented as an application programming interface (API) or as a series of libraries for use by a developer, or can be included within another software application, such as a terminal or personal computer operating system or a portable computing device operating system. Generally, as program modules include routines, programs, objects, components and data files which work together to perform particular functions, it will be understood that the functionality of the embodiment and of the broader invention claimed herein may be distributed across a number of routines, programs, objects components or data files, as required.

It will also be appreciated that where the method and system in accordance with at least an embodiment of the present invention are implemented with the aid of a computing system, or partly implemented by a computing system, any appropriate computing system architecture may be utilised. This includes stand alone computers, network computers, dedicated computing devices, or any device capable of receiving and processing information or data. Where the terms "computing system" and "computing devices" are utilised throughout the specification, these terms are intended to cover any appropriate arrangement of computer hardware and/or software required to implement at least an embodiment of the invention.

It will be appreciated by a person skilled in the art that numerous variations and/or modifications may be made to the invention as shown in the specific embodiments without departing from the spirit or scope of the invention as broadly described and claimed. The present embodiments are, therefore, to be considered in all respects as illustrative and not restrictive. In particular, the embodiments are presented by way of example only and are not intended to limit the scope of the invention, which may include any suitable combination of novel features herein disclosed.

What is claimed is:

1. A method for modelling data based on a dataset, comprising:
   in a computing system, executing:
   a training phase, wherein the dataset is applied to a non-stationary Gaussian process kernel in order to optimize the values of a set of hyperparameters associated with the non-stationary Gaussian process kernel, and
   an evaluation phase in which the dataset and the non-stationary Gaussian process kernel with optimized hyperparameters are used to generate model data, wherein the evaluation phase comprises a nearest neighbor selection operation, and wherein only a selected subset of nearest neighbor data in the dataset is used to generate each corresponding model data.

2. A method as claimed in claim 1, wherein the non-stationary Gaussian process kernel is a neural network kernel.

3. A method as claimed in claim 1, wherein the training phase comprises a combination optimization strategy.

4. The method of claim 3, wherein the combination optimization strategy comprises simulated annealing, with an output of a simulated annealing stage being input into a Quasi-Newton optimization stage.

5. A method as claimed in claim 1 wherein the dataset has at least 100,000 members, and wherein the method comprises sampling the dataset to obtain a training data subset that is applied in the training phase for optimization of the hyperparameters wherein the size of the training data subset is at least one order of magnitude smaller in size than the dataset.

6. The method of claim 1, wherein the dataset is measured terrain data.

7. The method of claim 1, comprising selecting an output resolution for the output model and generating the output model according to the selected resolution.

8. A method in accordance with claim 1, wherein the nearest neighbour selection operation utilizes a k-dimensional tree (KD-Tree) structure to access the dataset.

9. A method for modelling a dataset with spatial characteristics, comprising
   deriving, using a processing unit, a model from the dataset by providing the dataset to a Gaussian process using a non-stationary kernel,
   saving, within a memory, the dataset in a database that preserves the spatial characteristics of the dataset, wherein the database is adapted to provide a subset of nearest neighbour data in the dataset during regression of the Gaussian process.

10. A method in accordance with claim 9, wherein the database utilises a k-dimensional tree (KD-Tree) structure to store the dataset.

11. The method of claim 9, further comprising an operation of dividing the dataset into at least two subsets, the at least two subsets being used for deriving and applying the model.

12. A method as claimed in claim 9, wherein the non-stationary kernel is a neural network kernel.

13. A method as claimed in claim 9, further comprising:
   in a computing system, applying a combination optimization strategy during regression of the Gaussian process.

14. A method of claim 13, wherein the combination optimization strategy comprises simulated annealing, with an output of a simulated annealing stage being input into a Quasi-Newton optimization stage.

15. A system for modelling an area of terrain, comprising computer hardware, computer software, and computer memory containing information for defining a model for the area of terrain, the computer software comprising instructions for:
   a modelling module arranged to receive measured terrain data and utilise a Gaussian process using a non-stationary kernel to derive a model for the area of terrain, and
   a data structure arranged to receive a dataset comprising at least a subset of the measured terrain data, wherein the data structure preserves spatial characteristics of the dataset and is adapted to provide a subset of nearest neighbour data in the dataset during regression of the Gaussian process.

16. A system in accordance, with claim 15 wherein the data structure utilizes a k-dimensional tree (KD-Tree) structure to store the received data.

17. A system as claimed in claim 15, wherein the non-stationary kernel is a neural network kernel.

18. A system as claimed in claim 15, wherein the modelling module is further arranged to utilize a combination optimization strategy during regression of the Gaussian process.

19. A system of claim 18, wherein the combination optimization strategy comprises simulated annealing, with an output of a simulated annealing stage being input into a Quasi-Newton optimization stage.

20. A non-transitory computer readable medium storing executable instructions that when executed by a computer implement a method for modeling data based on a dataset, comprising:
   a training phase, wherein the dataset is applied to a non-stationary Gaussian process kernel in order to optimize the values of a set of hyperparameters associated with the non-stationary Gaussian process kernel, wherein the non-stationary Gaussian process kernel is a neural network kernel, and
   an evaluation phase in which the dataset and the non-stationary Gaussian process kernel with optimized hyperparameters are used to generate model data, wherein the evaluation phase comprises a nearest neighbour selection operation, wherein only a selected subset of nearest neighbour data in the dataset is used to generate each corresponding model data.

* * * * *